United States Patent
Alberti et al.

(10) Patent No.: US 9,218,176 B1
(45) Date of Patent: *Dec. 22, 2015

(54) SOFTWARE DEPLOYMENT IN A DISTRIBUTED VIRTUAL MACHINE ENVIRONMENT

(71) Applicant: International Business Machines Corporation, Armonk, NY (US)

(72) Inventors: Enrica Alberti, Rome (IT); Gianluca Mariani, Rome (IT); Antonio Secomandi, Milan (IT); Michele Tomassi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/303,746

(22) Filed: Jun. 13, 2014

(51) Int. Cl.
*G06F 9/44* (2006.01)
*G06F 9/445* (2006.01)
*G06F 9/455* (2006.01)

(52) U.S. Cl.
CPC .. *G06F 8/61* (2013.01); *G06F 8/63* (2013.01); *G06F 9/45504* (2013.01); *G06F 9/45558* (2013.01)

(58) Field of Classification Search
CPC ............... G06F 8/60; G06F 8/61; G06F 8/63; G06F 9/45558; G06F 2009/45562; G06F 2009/45575
See application file for complete search history.

(56) References Cited

U.S. PATENT DOCUMENTS

| | | | |
|---|---|---|---|
| 8,352,937 B2 | 1/2013 | Sanders et al. | |
| 8,539,488 B1 * | 9/2013 | Havemose | 718/100 |
| 8,789,041 B2 * | 7/2014 | Verma | 718/1 |
| 8,918,761 B1 * | 12/2014 | Whitcomb et al. | 717/120 |
| 2005/0240921 A1 * | 10/2005 | Barker et al. | 717/175 |
| 2008/0172664 A1 | 7/2008 | Nduaguba et al. | |

(Continued)

FOREIGN PATENT DOCUMENTS

CN 102915248 A 2/2013

OTHER PUBLICATIONS lshtiaq Ali, Virtual machines and networks-installations, performance, study, advantages and virtualization options, 2011, pp. 1-14.*

(Continued)

*Primary Examiner* — Thuy Dao
*Assistant Examiner* — Mongbao Nguyen
(74) *Attorney, Agent, or Firm* — Penny L. Lowry; Joseph Petrokaitis

(57) ABSTRACT

A computer implemented method for deploying, in a distributed virtual environment, a multi-component software product is disclosed. The method may include requesting and receiving product installation parameters, which may include virtual machine IDs corresponding to subsets of the product installation parameters. The method may also include copying software product installation files and parameters onto a first virtual machine, halting the first virtual machine, cloning the first virtual machine to a second virtual machine and setting virtual machine IDs on the virtual machines. The method may also include starting the virtual machines and identifying, based on virtual machine IDs, subsets of the product installation parameters. The method may also include deploying, based on subsets of the product installation parameters, the software product by installing first and second components of the software product on the first and second virtual machines, respectively.

6 Claims, 9 Drawing Sheets

(56) References Cited

U.S. PATENT DOCUMENTS

| | | | |
|---|---|---|---|
| 2009/0030953 A1* | 1/2009 | Fukuda et al. | 707/203 |
| 2010/0122248 A1* | 5/2010 | Robinson et al. | 718/1 |
| 2010/0235828 A1 | 9/2010 | Nishimura et al. | |
| 2011/0029968 A1 | 2/2011 | Sanders et al. | |
| 2011/0154320 A1 | 6/2011 | Verma | |
| 2011/0173605 A1 | 7/2011 | Bourne | |
| 2012/0215998 A1* | 8/2012 | Sharp et al. | 711/162 |
| 2012/0240110 A1* | 9/2012 | Breitgand et al. | 718/1 |
| 2012/0266168 A1* | 10/2012 | Spivak et al. | 718/1 |
| 2012/0311106 A1* | 12/2012 | Morgan | 709/220 |
| 2013/0007739 A1* | 1/2013 | Poddar et al. | 718/1 |
| 2013/0074068 A1* | 3/2013 | Ciano et al. | 718/1 |
| 2013/0185716 A1 | 7/2013 | Yin et al. | |
| 2014/0095676 A1* | 4/2014 | Beno et al. | 709/220 |
| 2014/0149633 A1* | 5/2014 | Tsirkin et al. | 711/6 |
| 2014/0229936 A1* | 8/2014 | Gaonkar et al. | 718/1 |
| 2015/0067168 A1* | 3/2015 | Hegdal et al. | 709/226 |
| 2015/0149997 A1* | 5/2015 | Tsirkin et al. | 718/1 |

OTHER PUBLICATIONS

Oracle, Creating and Using Oracle VM templates: The fastest way to deploy any enterprise software, 2009, pp. 3-13.* vmware, Understanding, Building and Deploying Virtual Appliances, 2011, pp. 2-10.*

Mell et al., "The NIST Definition of Cloud Computing," National Institute of Standards and Technology, U.S. Department of Commerce, Special Publication 800-145, Sep. 2011.

Alberti et al., "Software Deployment in a Distributed Virtual Machine Environment," U.S. Appl. No. 14/474,366, filed Sep. 2, 2014, IBM.

List of IBM Patents or Patent Applications Treated As Related, Aug. 28, 2014.

* cited by examiner

SOFTWARE DEPLOYMENT IN A DISTRIBUTED VIRTUAL MACHINE ENVIRONMENT

BACKGROUND

The present disclosure relates to virtual machines (VMs). In particular, this disclosure relates to automated software product deployment in a virtual machine environment.

A virtual machine (VM) may be a software implementation of a computing machine (i.e., a computer) that executes program instructions in a manner similar to a physical computing machine. A certain type of virtual machine may emulate an entire system platform which may support the execution of a complete operating system (OS) (e.g., WINDOWS or LINUX). Another type of virtual machine may emulate a single operating system process, which may be useful for running a single program. Software running on a VM may be limited to the resources and abstractions provided by the virtual machine, and may not operate outside of its virtual (limited) environment. Limiting a software application's accessibility to resources may be useful in protecting certain computing resources (e.g., memory, disk storage) which may be shared with other applications, programs or VMs, from software errors and security-related issues. Current use of virtual machines may include implementations which may have no direct correspondence to any physical machine hardware implementations.

A hypervisor or virtual machine monitor (VMM) may be a piece of computer software, firmware or hardware that may be used to create, provision and run virtual machines on a computer system. A computer on which a hypervisor is running one or more virtual machines may be defined as a "host" machine. Each virtual machine may be called a "guest" machine. The hypervisor may present guest machines with a virtual operating platform and may manage the execution of guest operating systems. A hypervisor may allow multiple instances of a variety of operating systems to share virtualized versions of hardware resources such as memory, disk storage space and IP addresses.

SUMMARY

Various aspects of the present disclosure may be useful for simplifying the deployment of a multi-component software product in a distributed virtual environment. A distributed virtual environment may include multiple virtual machines, each of which may host one or more software components which may interact with each other.

A deployment method configured according to embodiments of the present disclosure may require limited user time and interaction during deployment of a multi-component software product.

Embodiments may be directed towards a computer implemented method for deploying, in a distributed virtual environment, a software product having multiple components. The method may include requesting, in response to receiving a command to run a product installer on a first virtual machine, product installation parameters from a user, and receiving, from the user, product installation parameters. The product installation parameters may include a first virtual machine ID corresponding to a first subset of the product installation parameters and a second virtual machine ID corresponding to a second subset of the product installation parameters. The method may also include copying software product installation files and the product installation parameters onto the first virtual machine, halting the first virtual machine, cloning the first virtual machine to a second virtual machine and setting a first virtual machine ID on the first virtual machine and a second virtual machine ID on the second virtual machine. The method may also include starting the first and the second virtual machines and identifying, based on the first virtual machine ID, a first subset of the product installation parameters and based on the second virtual machine ID, a second subset of the product installation parameters. The method may also include deploying, based on the first subset and the second subset of the product installation parameters, the software product, from the software product installation files, by installing a first component of the software product on the first virtual machine, and installing a second component of the software product on the second virtual machine.

Embodiments may also be directed towards an electronic system for deploying, in a distributed virtual environment, a software product having multiple components. The electronic system may include a data storage device, a memory device and one or more processor circuits. The one or more processor circuits may be configured to request, in response to receiving a command to run a product installer on a first virtual machine, product installation parameters from a user. The processor circuits may also be configured to receive, from the user, product installation parameters which may include a first virtual machine ID corresponding to a first subset of the product installation parameters and a second virtual machine ID corresponding to a second subset of the product installation parameters. The processor circuits may also be configured to copy software product installation files and the product installation parameters onto the first virtual machine, halt the first virtual machine, and clone the first virtual machine to a second virtual machine. The processor circuits may also be configured to set a first virtual machine ID on the first virtual machine and a second virtual machine ID on the second virtual machine and to start the first and the second virtual machines. The processor circuits may also be configured to identify, based on the first virtual machine ID, a first subset of the product installation parameters and based on the second virtual machine ID, a second subset of the product installation parameters. The processor circuits may also be configured to deploy, based on the first subset and the second subset of the product installation parameters, the software product, from the software product installation files, by installing a first component of the software product on the first virtual machine, and installing a second component of the software product on the second virtual machine.

Aspects of the various embodiments may be used to automate the deployment of software products having a plurality of components running on a plurality of virtual machines. Aspects of the various embodiments may also be useful for limiting user input errors during the deployment process by collecting user input data pertaining to multiple software components in one data input session.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
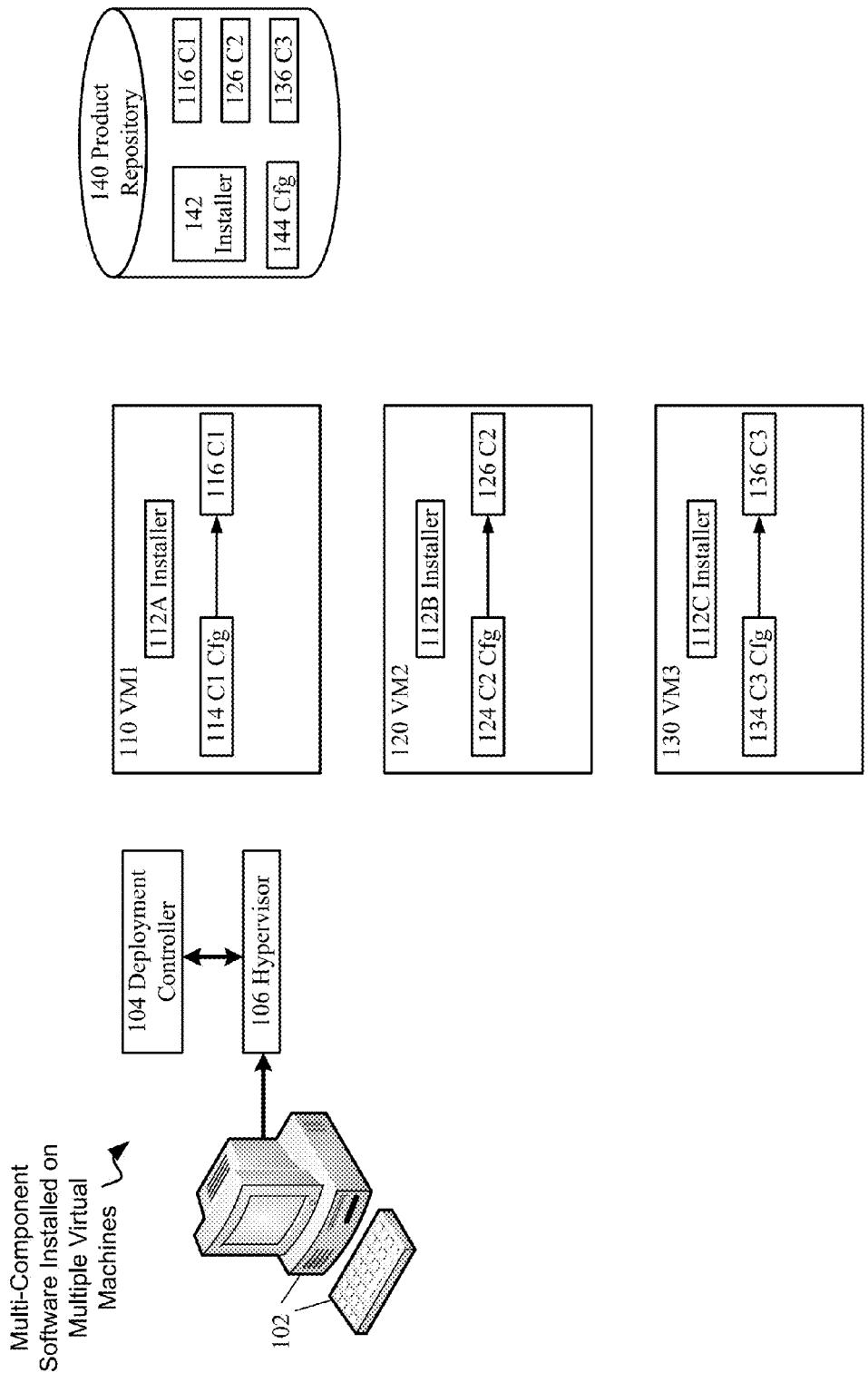
FIG. 1 depicts a distributed virtual environment with a multi-component software product deployed on multiple virtual machines, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing a method of automating deployment of commercially available (mature) software products having multiple components, within a distributed virtual machine (VM) environment. Such software products may include, but are not limited to cloud-based applications such as IBM SMART CLOUD PROVISIONING and IBM® SMART CLOUD ORCHESTRATOR, transaction processing applications, or other types of business software applications. While not necessarily limited thereto, embodiments discussed in this context can facilitate an understanding of various aspects of the disclosure. Certain embodiments may also be directed towards other associated applications, such as providing a method of automating deployment of software products undergoing development and/or test, which may have multiple components, within a distributed VM environment. Such software products may include, but are not limited to products with unverified stability and/or security. Embodiments may also be directed towards providing a method of automating deployment of multi-component software products having components running on multiple operating systems hosted within a multiple VM environment.

A software product having multiple components that may be run on multiple, interconnected computer systems (a distributed environment) may be installed by manually installing each component individually on a separate computer system. This process may involve a user/administrator performing multiple similar or redundant operations, such as the entry of software install parameters, for each software component and its corresponding host machine. A similar, time-consuming and possibly error-prone process may also be used in a distributed VM environment. An install process in a VM environment may also include steps of creating and starting VMs (and waiting for creation/starting to complete) before installing individual software components.

Various embodiments of the present disclosure relate to a method for automating deployment of multi-component software products in a distributed virtual machine environment with a single user, or administrator, interaction with a computer system. According to embodiments, the automated deployment may be therefore be useful for creating and cloning VMs and providing rapid installation of software components on multiple created VMs, while limiting or reducing user errors relative to a manual VM creation and software install process. Reduced user/administrator interaction time with a computer system may result from using the automated multi-component software deployment method.

Reliable and predictable VM creation and software component installation may result from the use of the method for automating deployment of multi-component software products in a distributed virtual machine environment. In certain embodiments, use of the deployment method may allow a user or system administrator to attend to other tasks while multiple VMs are automatically created, and multi-component software products are automatically installed.

An automated software deployment method according to certain embodiments may be compatible with existing and proven virtual machine (VM) software, hypervisors, computer systems and user input devices, and may be a useful and cost-effective way to provide efficient software installations. An automated software deployment method according to embodiments of the present disclosure may be executed on an existing computer system.

Automated cloning of a first VM to other created VMs may be useful in reducing user time spent on and interaction with (through a user input device) the software deployment process, and may provide error-free VM cloning and software deployment operations. Prior to cloning, the first VM may be populated (by a software installer) with common files useful for subsequently cloned VM's, including a software installer, individual software product components and configuration files specific to each software product component. Following the cloning process, the software installer on each VM may complete the software install process by installing one or more software components designated (through a VM ID) for a particular VM, and customize the software component's configuration, as specified in a corresponding configuration file.

Certain embodiments relate to automated deployment of a multi-component software product within a distributed VM environment.

FIG. 1 depicts a distributed virtual environment with a software product having multiple software components C1 116, C2 126 and C3 136 automatically installed and running on virtual machines VM1 110, VM2 120 and VM3 130, respectively, according to embodiments of the present disclosure. Software components (executables) C1 116, C2 126 and C3 136 may be installed in an automated fashion by software installers 112A, 112B and 112C and configured using configuration files C1 Cfg 114, C2 Cfg 124 and C3 Cfg 134, respectively.

A multi-component software product deployed in a distributed VM environment may be useful in providing a compartmentalized, secure and managed operating environment for each software component. Each software component running in a distributed VM environment may be allocated a separate and unique set of (virtualized) resources including but not limited to disk space, memory, IP addresses, and number of processors/processor cores.

Certain embodiments may provide an efficient multi-component software installation process by automatically creating multiple VMs, copying software installation files to the VMs, starting VMs, and completing the software installation on the VMs. This process may be useful in limiting both user/administrator installation time and potential (data input) errors throughout the installation process.

The VM environment may reside on an electronic computer system used for deploying, in the distributed virtual environment, a software product having multiple components. The computer system may include a data storage device (e.g., disk drive), a memory device (e.g., semiconductor memory), and one or more processor circuits, such as a microprocessors.

User input device 102 may be an electronic device through which a user may enter commands and data to a computer system through hypervisor 106. In embodiments, hypervisor 106 may have the capability, under the control of a user or deployment controller 104, to create, copy (clone), provision, and control (e.g., start and halt) VMs.

Product repository 140 may include a master VM image having a complete set of installer information, including software product components C1 116, C2 126 and C3 136 to be copied to and installed on created virtual machines by application installer 142 and associated configuration file 144. Application installer 142 may be replicated as software installers 112A, 112B and 112C, and software installation and configuration information in configuration file 144 may be copied into configuration files C1 Cfg 114, C2 Cfg 124 and C3 Cfg 134. In embodiments, product repository 140 may be located on a computer hosting the VMs, which may be useful in speeding with the installation process. In certain embodiments, product repository 140 may on a shared file system and/or disk, on an ISO file, or on another type of system that can be accessed from each virtual machine.

FIG. 1 depicts 3 VMs, however, in certain embodiments, a different number of VMs may be created (cloned) to correspond to a specific number of software components. For example, in an embodiment corresponding to a 2-component software product, 2 VMs may be created, and in a certain embodiment corresponding to a 5-component software product, 5 VMs may be created. In certain embodiments, all VMs may exist on the same computer system (hardware), and in certain embodiments, VMs may exist on a number of computer systems, which may have a number of different hypervisors. In embodiments, a shared product repository 140 and information exchange between deployment controllers 104 (interacting with different instances of hypervisor 106) may be used.

Figure 2:
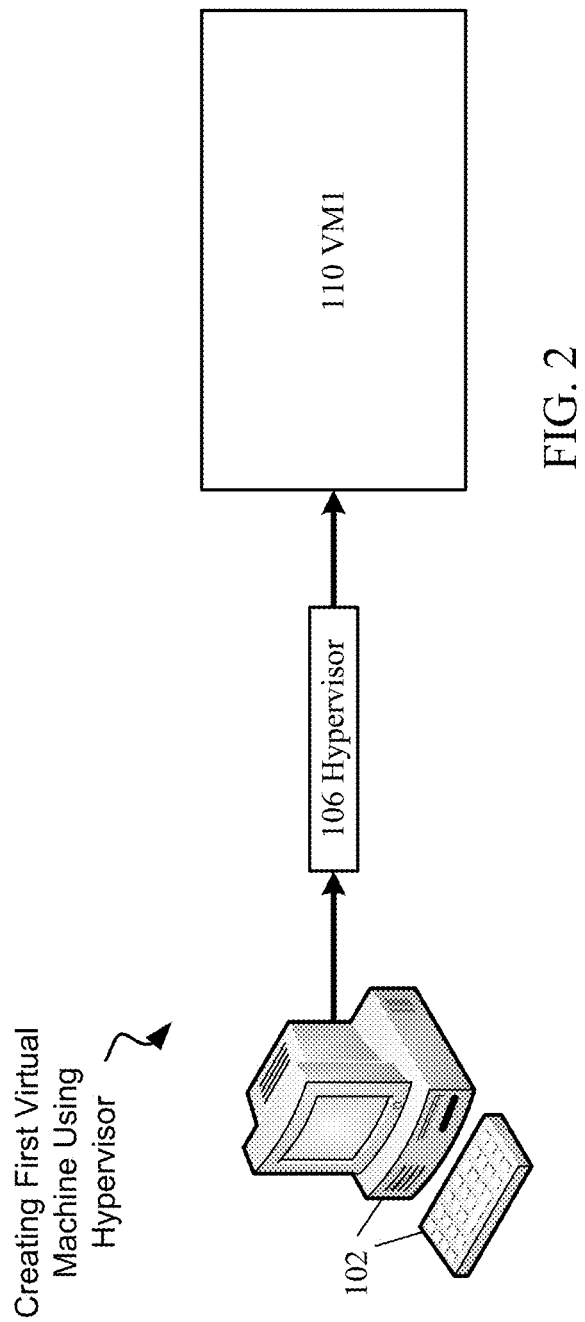
FIG. 2 depicts a flow diagram for creating, through the use of a hypervisor, a first virtual machine in a distributed virtual environment, according to embodiments.

FIG. 2 depicts creating, through the use of hypervisor 106, a first virtual machine VM1 110 in a distributed virtual environment, according to embodiments consistent with FIG. 1. A user may create virtual machine VM1 110 by issuing commands through a user input device 102 to a hypervisor 106. Types of user input devices 102 may include a terminal, a desktop personal computer (PC), a laptop computer or a tablet device, and may include both wired and wireless devices. Hypervisor 106 may be consistent with commercially available hypervisors, e.g., VMWARE ESX/ESXI, and may respond by creating (first) VM1 110.

Figure 3:
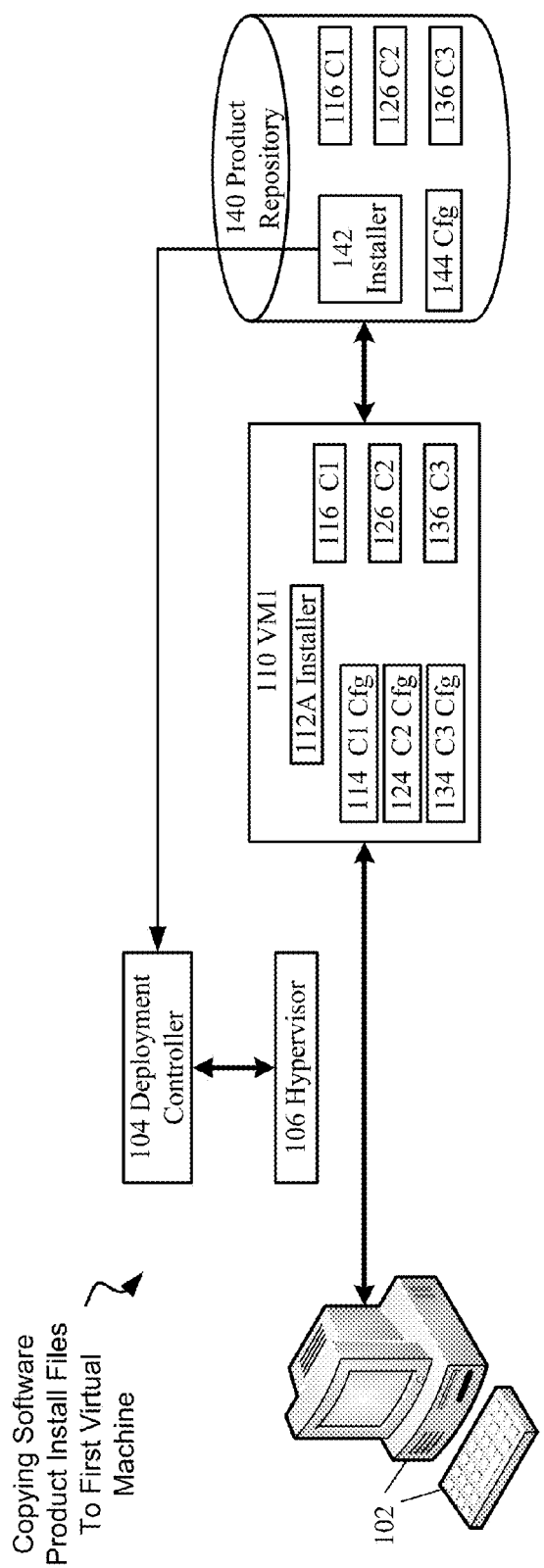
FIG. 3 depicts a flow diagram for copying software product installation files and the product installation parameters onto the first virtual machine, according to embodiments.

FIG. 3 depicts application installer 142 copying software product components C1 116, C2 126 and C3 136 and the product installation parameters in configuration file 144 from product repository 140 onto the first virtual machine 110 VM1, according to embodiments. Each file C1 116, C2 126 and C3 136 may contain executable code for a particular software component. Application installer 142 may be run on the first virtual machine (e.g., VM1 110) in response to a user issuing a command to run installer 142 to hypervisor 106, through user input device 102.

Application installer 142 may access user-defined product installation parameters, which may include a complete set of product installation parameters and configuration information pertaining to the software product components C1 116, C2 126 and C3 136.

In embodiments, user-defined product installation parameters may be received and accessed in response to query, from application installer 142, for user input. In certain embodiments, the installation parameters and configuration information may be grouped together, received and accessed through a batch file.

The received product installation parameters and configuration information may be merged with existing software parameters (possibly provided or pre-filled by the software vendor) into the configuration file Cfg 144, which may be stored in product repository 140. Information provided by the software vendor may present the characteristics/architecture required for the (virtual) machines hosting various software components. Once the installation parameters and configuration information have been provided, the system can be configured to complete the deployment process without further user interaction.

In certain embodiments, following completion of the software component deployment process, components and configuration files that may be unused on a particular VM instance may be deleted from that VM. For example, in an embodiment, if only product component C2 126 and associated configuration file 124 are used, then unused components such as C1 116 and C3 136, and configuration files 114 and 134 may be deleted following the completion of the product components C2 126 deployment.

Application installer 142 may copy and distribute program and configuration information, including software product components C1 116, C2 126 and C3 136, configuration files C1 Cfg 114, C2 Cfg 124, and C3 Cfg 134, and software installer 112A onto (first) VM1 110. Configuration files C1 Cfg 114, C2 Cfg 124, and C3 Cfg 134 may include subsets of information (product installation parameters), contained within configuration file 144, that are specifically targeted for the installation (deployment) of a particular software component. For example file C1 Cfg 114 may contain configuration information specific to software product component C1 116. Correlation of subsets of product installation parameters (contained in configuration files) to particular VMs may be achieved through the use of unique IDs for each VM. IDs may be recorded in the VM and a corresponding configuration file, and referenced by a software installer (e.g., 112A).

Product installation parameters may include, but are not limited to passwords, IP/network port numbers and addresses, a target host, a target installer file directory path/file name, program name, programs/data (i.e., disk) size, memory size, installation delay, and installation naming. Installation parameters and configurations may also include configuration parameters for the different application components, for example, administrator's definitions and credentials, services, and database connection parameters. Installation parameters may also include synchronization parameters, which may be useful in specifying a particular software component or virtual machine be started after completion of another task, or the starting of another VM.

A user may, during the installation process, specify parameters to tailor a software product component for a particular workload. For example if the application is to process data from a distributed source, a user may tailor the topology (number of hosts and host characteristics) based on an expected data flow. A user may also specify other parameters such as a number of system users, and a number of machines to be monitored.

The application installer 142 may then communicate to deployment controller 104 (running outside the virtual machine VM1 110) the number of times the (first) virtual machine VM1 110 is to be cloned to accommodate software components (e.g., C1 116, C2 126 and C3 136). Deployment controller 104 may then, by controlling hypervisor 106, halt the installed virtual machine VM1 110.

Figure 4:
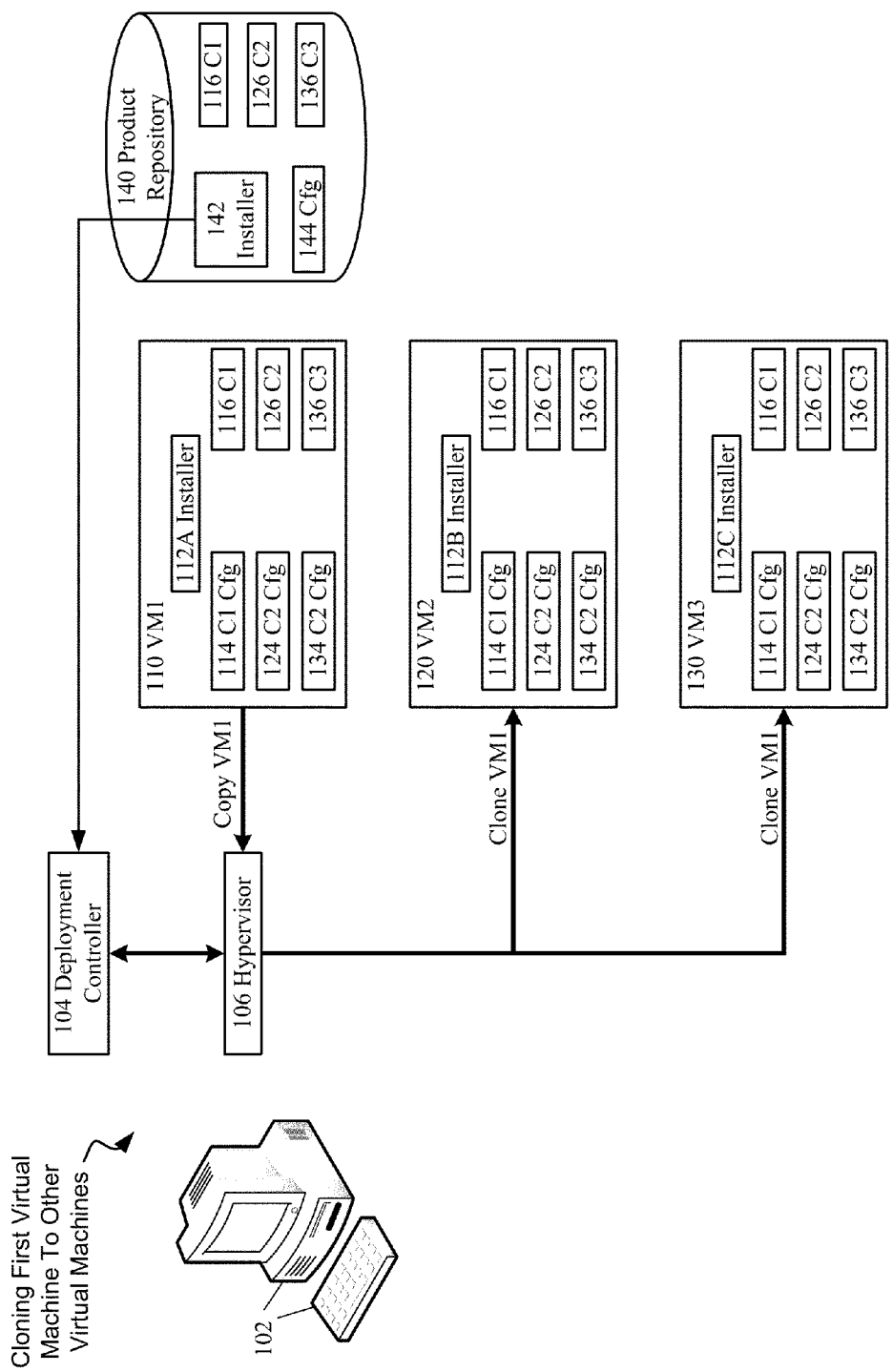
FIG. 4 depicts a flow diagram for cloning the first virtual machine to other virtual machines, according to embodiments.

FIG. 4 depicts deployment controller 104 controlling hypervisor 106 (outside of the VM environment) to clone the (first) virtual machine VM1 110 to a (second) virtual machine VM2 120 and a (third) virtual machine VM3 130, according to embodiments. Application installer 142 may initiate VM cloning by signaling deployment controller 104, which may respond by cloning the (first) virtual machine the number of times requested. The (first) installed virtual machine (e.g., VM1 110) may be cloned (copied) N−1 times, where "N" is the number of software product components to be installed on various virtual machines.

Automated cloning of (first) VM1 110 to other VMs may be useful in reducing user time spent on and interaction with (through user input device 102) the software deployment process, and may provide error-free VM cloning and software deployment operations. Cloning may include all files present on the first VM VM1 110 including software installer 112A, configuration files C1 Cfg 114, C2 Cfg 124, and C3 Cfg 134, and software product components C1 116, C2 126 and C3 136.

Once the cloning is completed, deployment controller 104 may set a first, second and subsequent virtual machine IDs on the cloned VMs (e.g., VM2 120, VM3 130), which may be useful to the software installers 112A, 112B and 112C in identifying which software component (of C1 116, C2 126, C3 136) to install on each particular VM. In order to clone and provision VM partitions, the hypervisor 106 may require parameters such as allocated memory size, storage (disk) size, IP addresses and network interface information for each VM partition. It may receive these parameters from application installer 142 and configuration file 144 (in product repository 140), through deployment controller 104.

Figure 5:
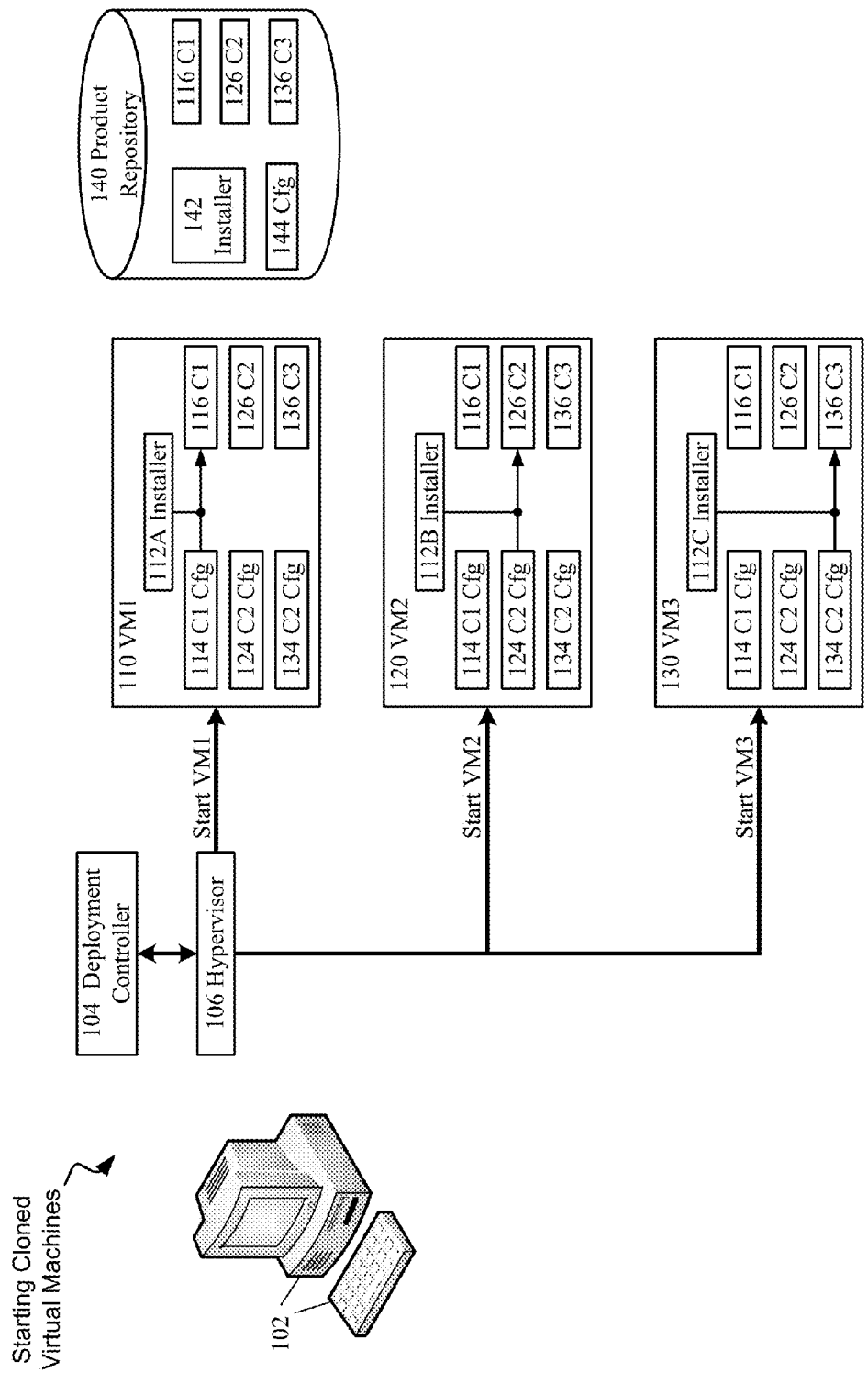
FIG. 5 depicts a flow diagram for starting multiple virtual machines, according to embodiments.

FIG. 5 depicts deployment controller 104 controlling hypervisor 106 (outside of the VM environment) to start the cloned VMs VM1 110, VM2 120 and VM3 130, according to embodiments. Cloned VMs may be started after the cloning process described in reference to FIG. 4.

Once each virtual machine (e.g., VM1 110, VM2 120 and VM3 130) is started, software installers 112A, 112B and 112C may install a particular software component(s) on each VM, according to a unique virtual machine ID set on each VM partition. A unique virtual machine ID may include a machine hostname, serial number or other type of VM identifier. The software installer local to each VM (e.g., installer 112A, 112B and 112C, which may be similar to each other) may complete the component (e.g., C1 116, C2 126 and C3 136) installation using the installation/configuration information contained in configuration files C1 Cfg 114, C2 Cfg 124, and C3 Cfg 134 to tailor the deployment of a particular software component.

Automated starting of VMs 110, 120, 130 and completion of software installs may be useful in reducing user time and interaction with (through user input device 102) the software deployment process, and providing fast and error-free software deployment operations.

Installers 112A, 112B and 112C may use code local to their respective VMs, or may execute code stored in product repository 140 complete software component installations on a particular VM partition. A (first) set of processes started on the first virtual machine may be different than a (second) set of processes started on a second virtual machine. For example, a particular VM may be started with processes supporting a full operating system (e.g., Linux or Windows), while another VM may be started with processes supporting only a particular program, such as a network or database application. Similarly, a particular VM may have a (first) set of allocated resources and a (second) VM may have a second set of allocated resources different than the first set of allocated resources. For example, a particular VM may be started with a certain amount of (virtual) disk space (e.g., 1 GB), while another VM may be started with a different amount of (virtual) disk space (e.g., 20 GB). Particular resources allocated to a particular VM may depend on operating system and/or application needs corresponding to that VM.

VM resources may include, but are not limited to a number of (virtual) Central Processing Units (CPUs) or processor cores, access to disk storage volumes and/or volume sizes, memory allocation, access to IP addresses and network adapters and other system resources.

Deployment controller 104 and software installers (e.g., installer 112A) may sequence, delay, or coordinate the timing of VM and application installation and starting based on synchronization parameters. Synchronization actions may include waiting on a particular event such as the creation or initialization of a network port, creation of a particular file on a shared disk, or the presence of socket information to manage dependencies among software components. For example, the presence of a particular network port may be used as a prerequisite condition for starting a particular network application. Other types of synchronization actions may include starting a (first) VM before starting a (second) VM, or an starting an initialization task on the (first) VM after starting it, and waiting until the completion of the initialization task before starting a (second) VM.

Synchronization parameters may be added by a user when application installer 142 queries a user for input (as described in reference to FIG. 3), stored in configuration file 144 and subsequently configuration files 114, 124 and 134 as needed, and acted upon during the starting of VMs and the completion of software installation following the starting of the VMs.

In certain embodiments all installed software components may be installed on virtual machines having a (first) operating system (e.g., Windows). In some embodiments, certain installed software components may be installed on virtual machines having a different (second) operating system (e.g., Linux). A user may create one (first) VM for each operating system, and install the operating system on it, as described in reference to FIG. 2. The installation process may then continue with the user providing the installation parameters corresponding to each unique type of the (first) VM. Application installer 142 may then copy the provided installation information to the second virtual machine and then signal deployment controller 104 to clone the VMs.

Figure 6:
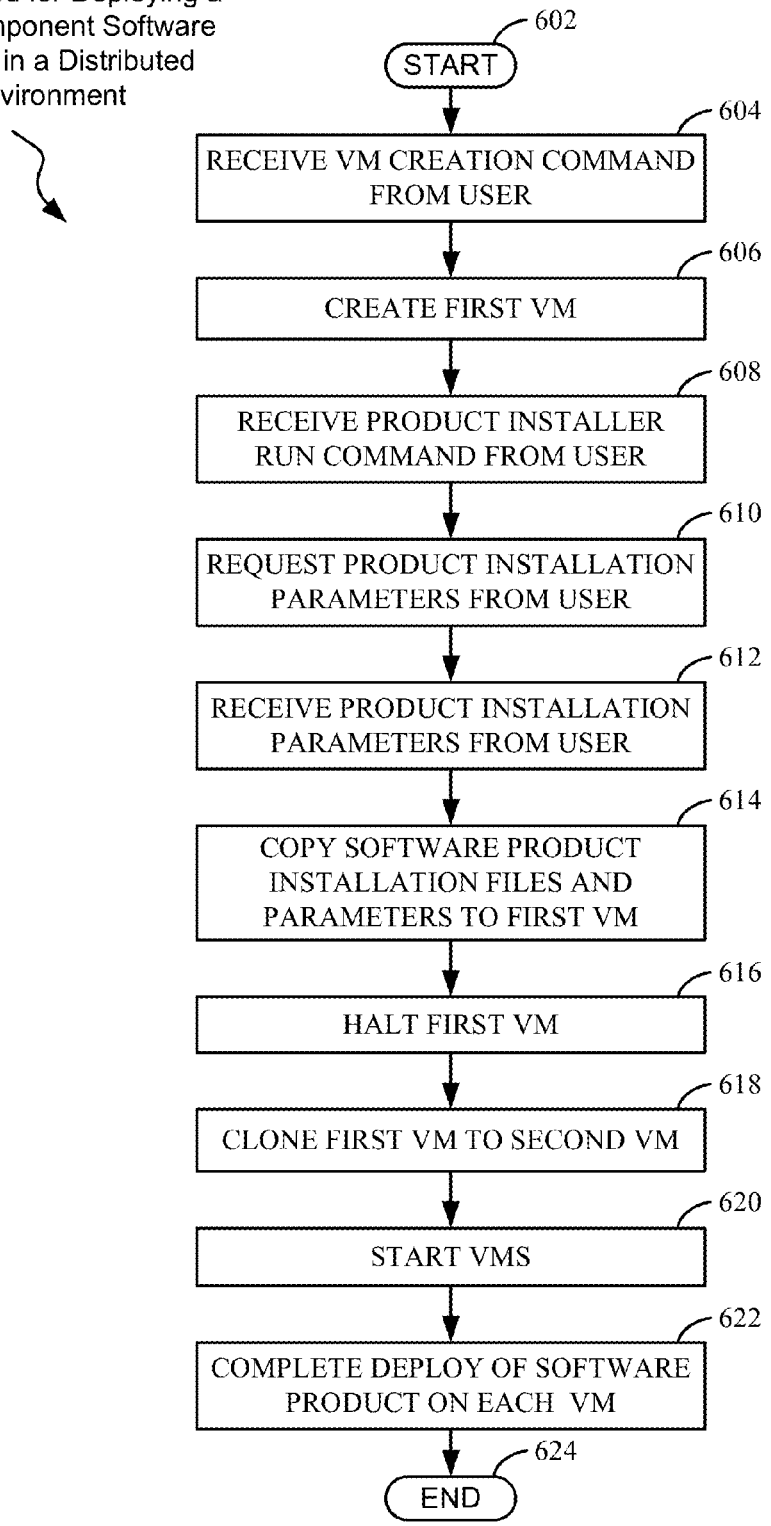
FIG. 6 is a flow diagram illustrating a method for deploying a multi-component software product in a distributed environment, according to embodiments.

FIG. 6 is a flow diagram, consistent with the figures, illustrating a method for deploying a multi-component software product in a distributed environment, according to embodiments. The process 600 moves from start 602 to operation 604. Operation 604 generally refers to receiving a VM creation command from a user, which may correspond to FIG. 2 and its associated description. The VM creation command may be input by the user into user input device 102 and acted upon by hypervisor 106. User input device 102 may be a terminal, a desktop personal computer (PC), a laptop computer or a tablet device, and may include both wired and wireless devices. Hypervisor 106 may be consistent with commercially available hypervisors, e.g., VMWARE ESX/ ESXI. Once the VM creation command is received, the process moves to operation 606.

Operation 606 generally refers to creating a first VM, which may correspond to FIG. 2 and its associated description. Hypervisor 106 may respond to a command received in operation 604 by creating (first) VM1 110 (FIG. 2). Once the first VM is created, the process moves to operation 608.

Operation 608 generally refers to receiving a product installer run command from a user, which may correspond to FIG. 3 and its associated description. The product installer run command may be entered by the user into user input device 102, and received by hypervisor 106, which may invoke the application installer such as 142 (FIG. 3). Once the product installer run command is received, the process moves to operation 610.

Operation 610 generally refers to the application installer (such as 142, FIG. 3) requesting product installation parameters from a user, which may correspond to FIG. 3 and its associated description. Product installation parameters may include a variety of information that may be used to configure the installation of software components on a plurality of created virtual machines. Information such as an amount of disk space, or memory may be used to specify a (virtual) operating environment for a particular software component. Other types of information (synchronization parameters) may specify a particular order in which to install or start software or VMs, which may be useful in managing software dependency issues. Once the product installation parameters have been requested, the process moves to operation 612.

Operation 612 generally refers to receiving product installation parameters from a user, which may correspond to FIG. 3 and its associated description. Product installation parameters may be stored in combination with previously defined parameters (e.g., received from a software vendor) in configuration file 144. Once the product installation parameters are received from a user, the process moves to operation 614.

Operation 614 generally refers to copying software product installation files and parameters to a first VM (i.e., VM1 110, FIG. 3), which may correspond to FIG. 3 and its associated description. The software product installation files may include software components (e.g. C1 116, FIG. 3) targeted to be installed on a particular VM, a software installer (e.g., 142) and parameters contained in a configuration file such as Cfg 144 (FIG. 3). Once the software product installation files and parameters are copied to a first VM, the process moves to operation 616.

Operation 616 generally refers to halting the first VM, which may correspond to FIG. 3 and its associated description. The first VM VM1 110 (FIG. 3) may be halted in order to enable its contents to be subsequently copied (cloned) onto other created VMs. Hypervisor 106, controlled by a deployment controller 104 may be used to halt VM1 110. Once the first VM is halted, the process moves to operation 618.

Operation 618 generally refers to cloning (first) VM VM1 110 (FIG. 4) to a second and subsequent VMs (e.g., VM2 120, FIG. 4), which may correspond to FIG. 4 and its associated description. Although 2 cloned VMs are illustrated and discussed in reference to FIG. 4, the cloning may include an arbitrary number of "N" VMs, which may correspond to a number "N" of software components, in certain embodiments. Once the first VM is cloned to other VMs, the process moves to operation 620.

Operation 620 generally refers to starting VMs, which may correspond to FIG. 5 and its associated description. Hypervisor 106, controlled by a deployment controller 104 may be used to start the VMs. Synchronization parameters may be used to sequence and/or delay VM starts in order to satisfy software dependency requirements. Once the VMs are started, the process moves to operation 622.

Operation 622 generally refers to deploying software components on individual VMs, which may correspond to FIG. 5 and its associated description. Software installers (e.g., 112A, 112B and 112C) may be employed to complete the software installation process on individual VMs. Software installers may install and configure software components according to product installation parameters contained in configuration files (e.g. 114, 124 and 134). Following the completion of software components on the VMs, the process 600 may end at block 624.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
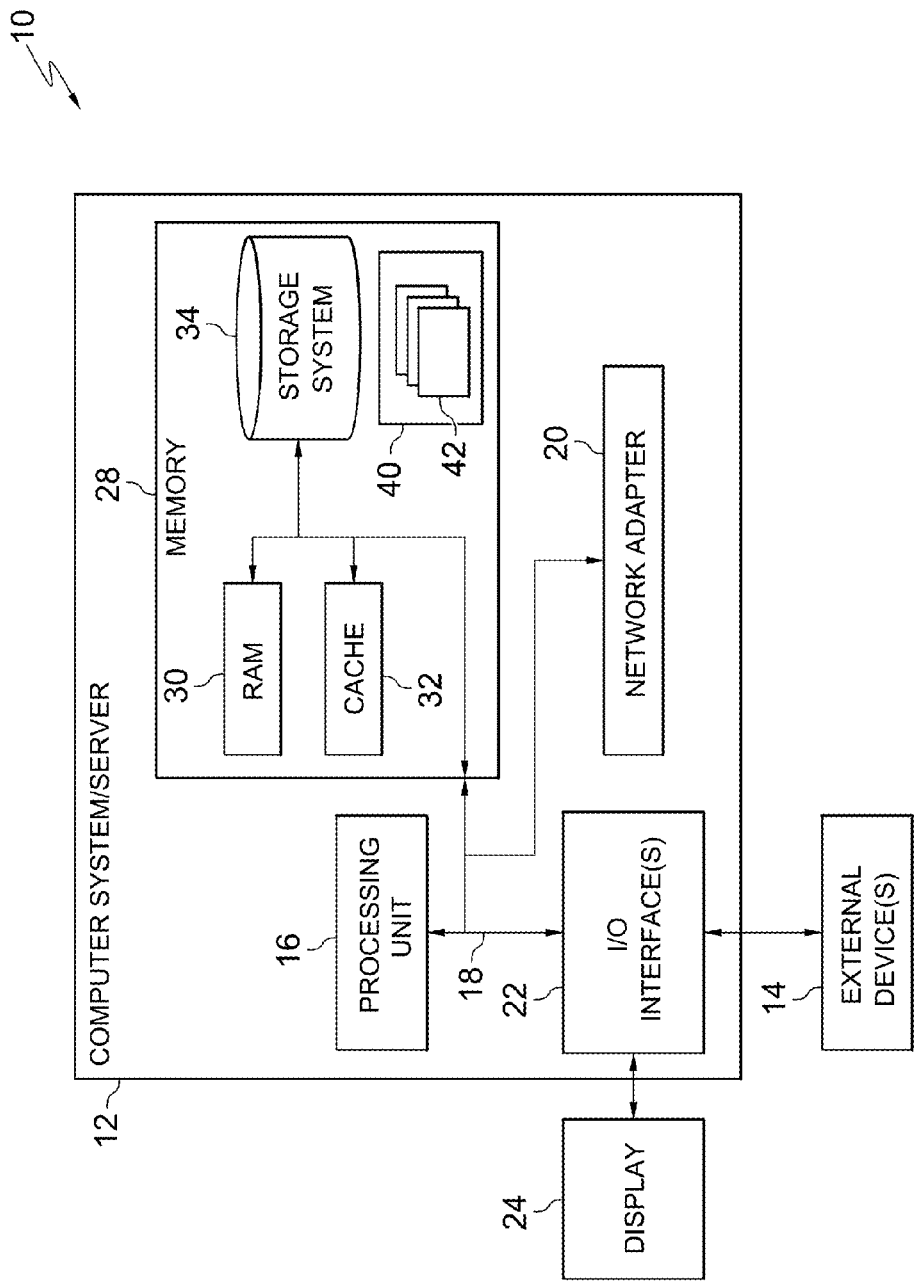
FIG. 7 depicts a cloud computing node, according to an embodiments of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
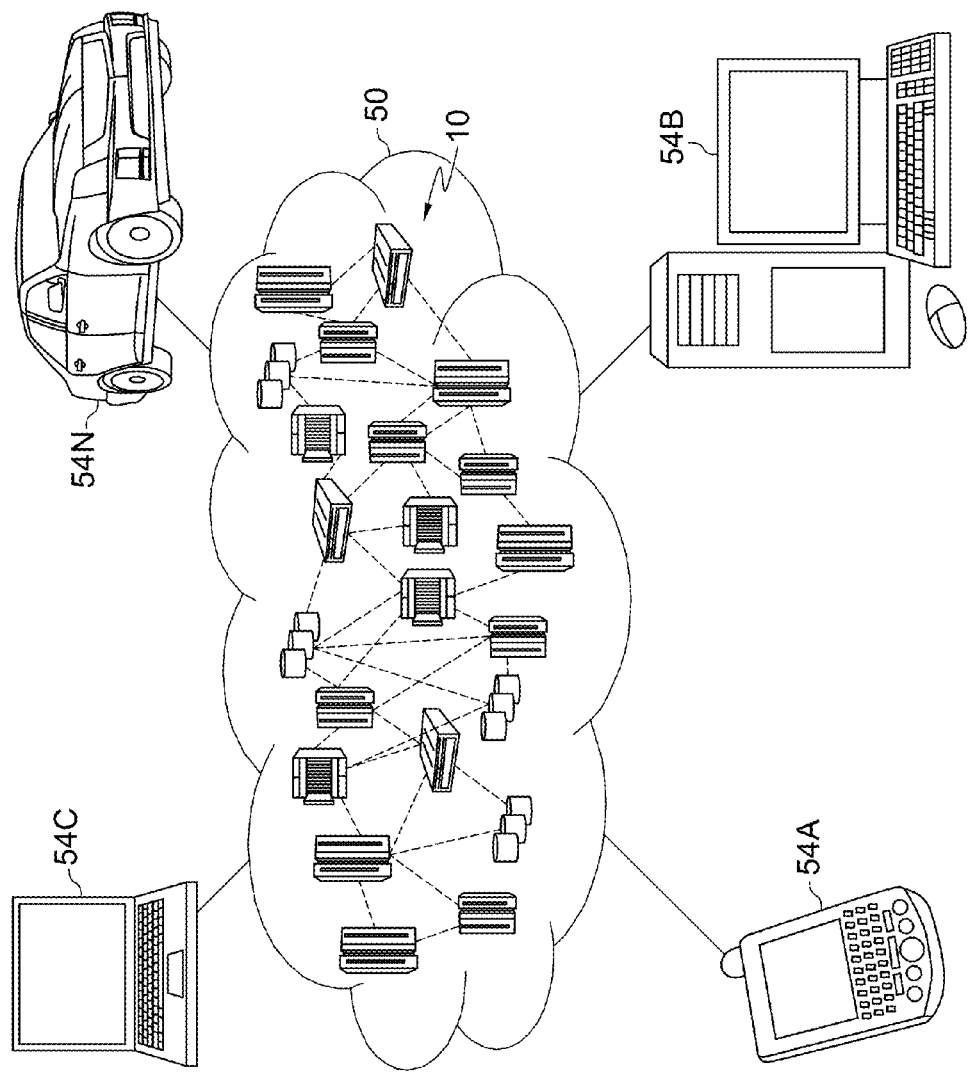
FIG. 8 depicts a cloud computing environment, according to embodiments of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
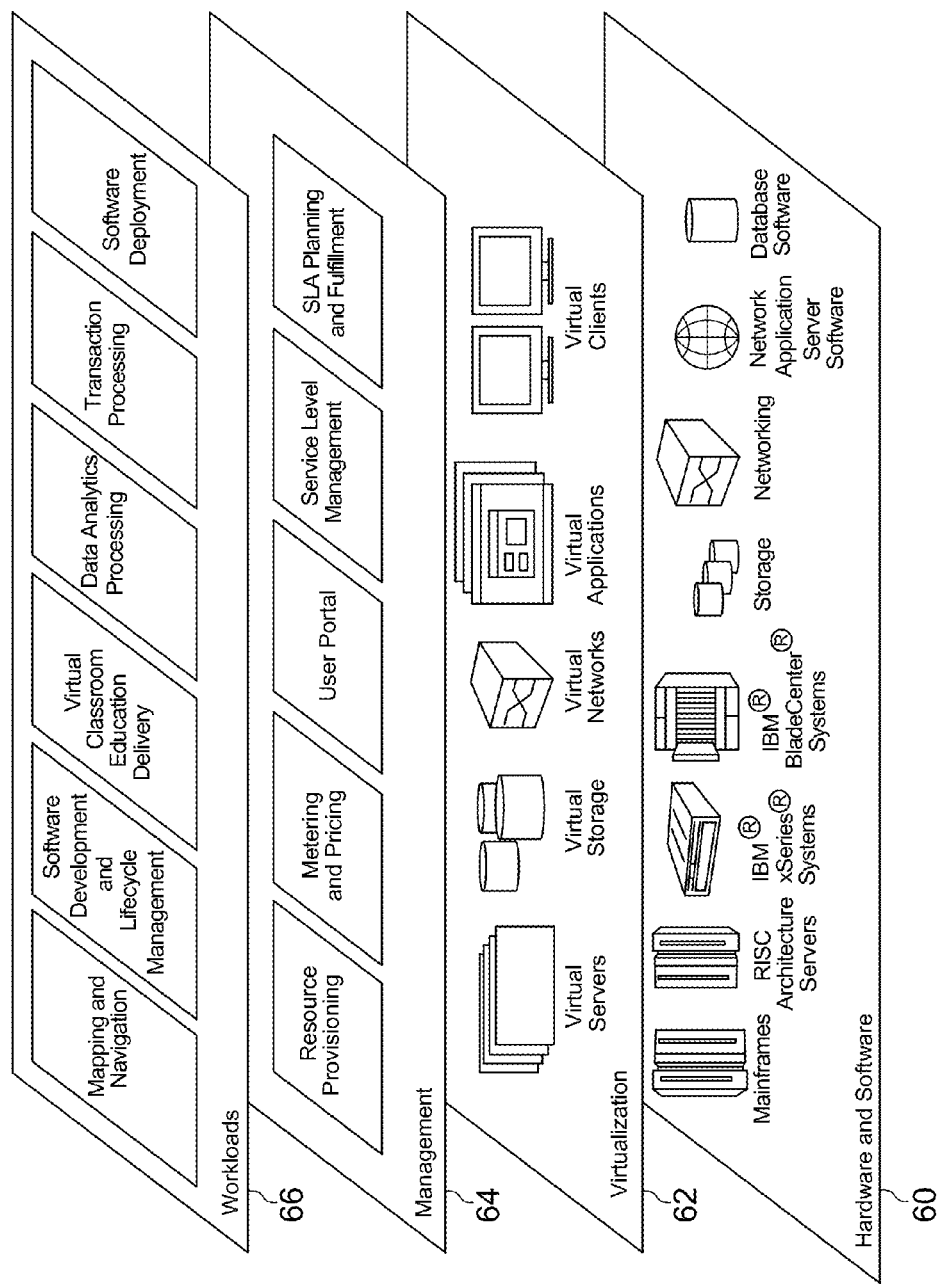
FIG. 9 depicts abstraction model layers, according to embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes, in one example IBM zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and software deployment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for deploying, in a distributed virtual environment, a software product having multiple components, the computer program product comprising a non-transitory computer readable storage medium having program instructions embodied therewith, the program instructions executable by one or more processing circuits to cause the one or more processing circuits to perform a method comprising:
    accessing, in response to receiving a command to run a product installer on a first virtual machine, user-defined product installation parameters including;
        a first virtual machine ID corresponding to a first subset of the product installation parameters; and
        a second virtual machine ID that is different than the first virtual machine ID, the second virtual machine ID corresponding to a second subset of the product installation parameters that is different than the first subset of the product installation parameters;
    copying software product installation files and the product installation parameters onto the first virtual machine;
    halting the first virtual machine;
    cloning the first virtual machine to a second virtual machine;
    setting a first virtual machine ID on the first virtual machine and a second virtual machine ID on the second virtual machine;
    starting the first and the second virtual machines;

identifying, based on the first virtual machine ID, a first subset of the product installation parameters and based on the second virtual machine ID, a second subset of the product installation parameters; and deploying, based on the first subset and the second subset of the product installation parameters, the software product, from the software product installation files, by installing a first component of the software product on the first virtual machine, and installing a second component of the software product on the second virtual machine.

2. An electronic system for deploying, in a distributed virtual environment, a software product having multiple components, the electronic system comprising:

a data storage device;

a memory device;

one or more processor circuits configured to:

access, in response to receiving a command to run a product installer on a first virtual machine, user-defined product installation parameters including;

a first virtual machine ID corresponding to a first subset of the product installation parameters; and a second virtual machine ID that is different than the first virtual machine ID, the second virtual machine ID corresponding to a second subset of the product installation parameters that is different than the first subset of the product installation parameters;

copy software product installation files and the product installation parameters onto the first virtual machine;

halt the first virtual machine;

clone the first virtual machine to a second virtual machine;

set a first virtual machine ID on the first virtual machine and a second virtual machine ID on the second virtual machine;

start the first and the second virtual machines;

identify, based on the first virtual machine ID, a first subset of the product installation parameters and based on the second virtual machine ID, a second subset of the product installation parameters; and deploy, based on the first subset and the second subset of the product installation parameters, the software product, from the software product installation files, by installing a first component of the software product on the first virtual machine, and installing a second component of the software product on the second virtual machine.

3. The electronic system of claim 2, wherein the first subset of the product installation parameters correlates to a unique virtual machine ID of the first virtual machine.

4. The electronic system of claim 2, wherein the second subset of the product installation parameters correlates to a unique virtual machine ID of the second virtual machine.

5. The electronic system of claim 2, further comprising:
a deployment controller that is configured to control a hypervisor, to copy software product installation files and the product installation parameters, to halt the first virtual machine, to clone the first virtual machine, to set a first and a second virtual machine ID and to start the first and the second virtual machines.

6. The electronic system of claim 2, further comprising:
a program installer that is configured to identify a first and a second subset of the product installation parameters and to deploy, based on the first subset and the second subset of the product installation parameters, the software product.

* * * * *